(12) United States Patent
Choi (10) Patent No.: US 8,963,499 B2
(45) Date of Patent: Feb. 24, 2015

(54) BATTERY PACK, METHOD OF CONTROLLING THE SAME, AND ENERGY STORAGE SYSTEM INCLUDING THE BATTERY PACK

(75) Inventor: Hyo-Joon Choi, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 981 days.

(21) Appl. No.: 13/090,121

(22) Filed: Apr. 19, 2011

(65) Prior Publication Data

US 2012/0086399 A1    Apr. 12, 2012

(30) Foreign Application Priority Data

Oct. 12, 2010    (KR) .................... 10-2010-0099291

(51) Int. Cl.
  *H02J 7/00*    (2006.01)
  *H02J 3/32*    (2006.01)
  *H02J 9/06*    (2006.01)
(52) U.S. Cl.
  CPC .............. *H02J 7/0016* (2013.01); *H02J 7/0026* (2013.01); *H02J 3/32* (2013.01); *H02J 9/062* (2013.01)
  USPC ............................ 320/118; 320/116; 320/122
(58) Field of Classification Search
  CPC ....................................................... Y02E 60/12
  USPC ................................................. 320/116, 122
  See application file for complete search history.

(56) References Cited

U.S. PATENT DOCUMENTS

2008/0211459 A1*    9/2008    Choi .............................. 320/134

FOREIGN PATENT DOCUMENTS

| JP | 11-023676 | | 1/1999 |
|---|---|---|---|
| JP | 2002-272010 | A | 9/2002 |
| JP | 2003-282155 | A | 10/2003 |
| JP | 2009-178040 | A | 8/2009 |
| KR | 10-0666817 | B1 | 1/2007 |
| KR | 10-0680901 | B1 | 2/2007 |

(Continued)

OTHER PUBLICATIONS

Korean Registration Determination Certificate dated Aug. 29, 2012 for Korean Patent Application No. KR 10-2010-0099291 which corresponds to captioned U.S. Appl. No. 13/090,121.

(Continued)

*Primary Examiner* — Edward Tso
*Assistant Examiner* — Ahmed Omar
(74) *Attorney, Agent, or Firm* — Knobbe Martens Olson & Bear LLP (57) ABSTRACT

A battery pack, a method of controlling the same, and an energy storage system including the battery pack are disclosed. According to some aspects, the method may include calculating charge capacities of the battery cells, obtaining a first average value, which is an average value of the calculated charge capacities, establishing a first standard value for selecting an abnormal battery cell based on the first average value and determining a first battery cell having the lowest charge capacity from among battery cells having charge capacities greater than the first standard value. A second standard value for selecting a battery cell that is to be discharged during a cell balancing operation may be established. A cell balancing operation with respect to battery cells having charge capacities greater than the second standard value may then be performed. Accordingly, a cell balancing operation may be effectively performed in order to efficiently manage a battery pack.

19 Claims, 7 Drawing Sheets

(56) References Cited

FOREIGN PATENT DOCUMENTS

| KR | 10-2008-0080864 A | 9/2008 |
| KR | 10-2009-0103132 A | 10/2009 |
| KR | 10-2010-0020113 A | 2/2010 |

OTHER PUBLICATIONS

Korean Office Action dated Jan. 5, 2012 for Korean Patent Application No. KR 10-2010-0099291 which corresponds to captioned U.S. Appl. No. 13/090,121.

\* cited by examiner

BATTERY PACK, METHOD OF CONTROLLING THE SAME, AND ENERGY STORAGE SYSTEM INCLUDING THE BATTERY PACK

CROSS-REFERENCE TO RELATED APPLICATIONS

This application claims the benefit of Korean Patent Application No. 10-2010-0099291, filed on Oct. 12, 2010, in the Korean Intellectual Property Office, the disclosures of which are incorporated herein in their entirety by reference.

BACKGROUND

1. Field

The disclosed technology relates to a battery pack, a method of controlling the same, and an energy storage system including the battery pack.

2. Description of the Related Technology

Recently, systems capable of storing power and efficiently using the stored power have attracted attention by the research community. Given the serious problems associated with the destruction of the environment and resource depletion, systems capable of storing power and effectively using the stored power provide a solution to the environmental problems associated with power generation.

In addition, it is desirable to generate renewable energy that does not cause pollution during power generation. Energy storage systems generally connect source of renewable energy, a battery storing power, and an existing grid power. Research and development have recently been conducted on energy storage systems in accordance with recent awareness of power generation effects on the environment.

SUMMARY OF CERTAIN INVENTIVE ASPECTS

According to some aspects a battery pack capable of effectively performing cell balancing, a method of controlling the battery pack, and an energy storage system including the battery pack are disclosed.

Additional aspects will be set forth in part in the description which follows and, in part, will be apparent from the description, or may be learned by practice of the presented embodiments.

According to one aspect, a method of controlling a battery pack comprising a plurality of battery cells is disclosed. The method includes calculating charge capacities of the battery cells, obtaining a first average value, wherein the first average value is an average value of the calculated charge capacities, establishing a first standard value for selecting an abnormal battery cell based on the first average value, determining a first battery cell having the lowest charge capacity from among battery cells having charge capacities greater than the first standard value, establishing a second standard value for selecting at least one battery cell that is to be discharged during a cell balancing operation, and performing a cell balancing operation with respect to the at least one battery cell having charge capacities greater than the second standard value.

According to one aspect, a battery pack is disclosed. The battery pack may include a plurality of battery cells, a capacity measuring unit configured to measure charge capacities of the battery cells, an average value calculator configured to calculate an average value of the measured charge capacities, a balancing controller configured to select at least one battery cell that is to be discharged during a cell balancing operation based on the measured charge capacities and the average value, and a balancing circuit unit configured to perform the cell balancing operation according to a control signal applied from the balancing controller.

According to one aspect, an energy storage system that is connected to a battery including a plurality of battery cells, a power generation system, and a grid so as to supply power to a load is disclosed. The energy storage system may include a capacity measuring unit configured to measure charge capacities of the battery cells, an average value calculator configured to calculate an average value of the measured charge capacities, and a balancing controller configured to select at least one battery cell that is to be discharged during a cell balancing operation based on the measured charge capacities and the average value, and wherein the balancing controller is further configured to perform a cell balancing operation with respect to the selected battery cell.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF CERTAIN INVENTIVE EMBODIMENTS

Various aspects will now be described more fully with reference to the accompanying drawings, in which some embodiments of the inventive aspects are illustrated. The inventive concept may, however, be embodied in many different forms by one of ordinary skill in the art without departing from the technical scope of the inventive concept. Throughout the description, the detailed descriptions of well-known functions and structures may be omitted so as not to hinder the understanding of the various embodiments.

Hereinafter, certain aspects will be described in detail by explaining some embodiments with reference to the attached drawings. Like reference numerals in the drawings denote like elements, and any repeated description thereof will be omitted.

Figure 1:
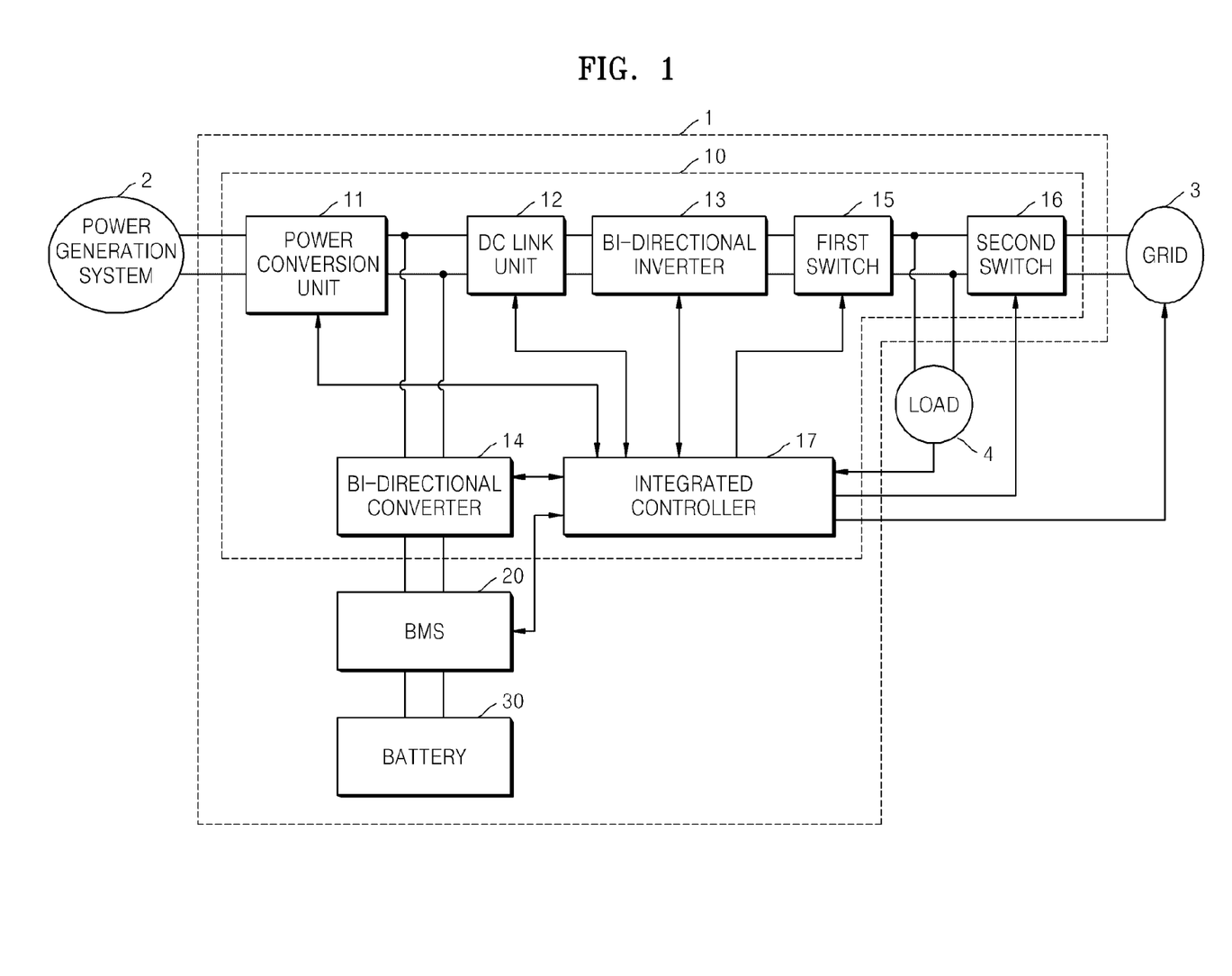
FIG. 1 is a block diagram illustrating an energy storage system, according to some embodiments.

FIG. 1 is a block diagram illustrating an energy storage system 1, according to some embodiments.

Referring to FIG. 1, the energy storage system 1 according to some embodiments is connected to a power generation system 2 and a grid 3 to supply power to a load 4.

The power generation system 2 generates power by using an energy source and supplies the power to the energy storage system 1. The power generation system 2 may be any power generation system for generating power by using renewable energy, for example, a photovoltaic system, a wind power generation system, a tidal power generation system, or the like.

The grid 3 includes a power plant, a substation, a power line, and the like. The grid 3 applies power to the energy storage system 1 so as to supply power to the load 4 and/or a battery 30. The grid 3 also receives power from the energy storage system 1.

The load 4 consumes power generated by the power generation system 2, power stored in the battery 30, and power supplied from the grid 3. The load 4 may be, for example, a home, a manufacturing plant, or the like.

The energy storage system 1 may store power generated by the power generation system 2 in the battery 30 and supply the power to the grid 3. The energy storage system 1 may supply power stored in the battery 30 to the grid 3 or store power supplied from the grid 3 in the battery 30. The energy storage system 1 may also perform an uninterruptible power supply (UPS) operation when a power failure occurs in the grid 3.

The energy storage system 1 includes a power conversion system (PCS) 10, a battery management system (BMS) 20, and the battery 30. The PCS 10 converts power of the power generation system 2, the grid 3, and the battery 30 into an appropriate power and supplies the converted power to the required destination. The PCS 10 generally include a power conversion unit 11, a direct current (DC) link unit 12, a bi-directional inverter 13, a bi-directional converter 14, a first switch 15, a second switch 16, and an integrated controller 17.

The power conversion unit 11 is connected between the power generation system 2 and the DC link unit 12. The power conversion unit 11 delivers power generated by the power generation system 2 to the DC link unit 12 by converting a voltage output by the power generation system 2 into a DC link voltage.

The power conversion unit 11 may be a converter or a rectifier circuit according to the type of the power generation system 2. When the power generation system 2 generates DC power, the power conversion unit 11 may be a converter for converting the DC power into alternating current (AC) power. When the power generation system 2 generates AC power, the power conversion unit 11 may be a rectifier circuit for converting the AC power into DC power. In particular, when the power generation system 2 generates power by using solar light, the power conversion unit 11 may include a maximum power point tracking (MPPT) converter for performing MPPT control so as to maximize the amount of power generated by the power generation system 2 according to a change in insulation or a temperature.

The DC link unit 12 is connected between the power conversion unit 11 and the bi-directional inverter 13. The DC link unit 12 maintains a DC link voltage at a stable level even when there is a sudden drop in voltage output by the power generation system 2, or the grid 3. Furthermore, the DC link unit 12 may be configured to maintain a stable DC link voltage when a peak or spike of the requirements of the load 4 is generated.

The bi-directional inverter 13 is a power converter connected between the DC link unit 12 and the first switch 15. The bi-directional inverter 13 converts a DC link voltage output from the power generation system 2 and/or the battery 30 into an AC voltage appropriate for the grid 3 and outputs the AC voltage. In addition, the bi-directional inverter 13 rectifies an AC voltage supplied by the grid 3 into a DC link voltage, and outputs the DC link voltage in order to store power supplied from the grid 3 in the battery 30 in a charging mode.

The bi-directional inverter 13 may include a filter for removing higher harmonics from an AC voltage to be output to the grid 3, and a phase locked loop (PLL) circuit for synchronizing a phase of the AC voltage to be output and a phase of an AC voltage of the grid 3. The bi-directional inverter 13 may perform functions such as restriction of a voltage change range, improvement of a power-factor, elimination of a DC component, protection against a transient phenomenon, and the like.

The bi-directional converter 14 DC-DC converts power stored in the battery 30 into power having a voltage level required by the bi-directional inverter 13. For example, the bid-directional converter 14 may receive a DC link voltage, and output the DC link voltage in a discharging mode. In addition, the bi-directional converter 14 DC-DC converts power output from the power conversion unit 11 or power output from the bi-directional inverter 13 into power having a voltage level required by the battery 30. For example, the bi-directional converter 14 may convert a voltage level to a charging voltage, in a charging mode of the battery 30.

The first switch 15 and the second switch 16 are connected to each other in series between the bi-directional inverter 13 and the grid 3. Control current flows between the power generation system 2 and the grid 3 by performing ON/OFF operations under the control of the integrated controller 17. The ON/OFF operations of the first switch 15 and the second switch 16 may be performed according to states of the power generation system 2, the grid 3, and the battery 30. For example, when an amount of power required in the load 4 is great, the first switch 15 and the second switch 16 are turned on so as to use both power of the power generation system 2 and power of the grid 3. When power output from the power generation system 2 and the grid 3 may not satisfy an amount of power required in the load 4, power stored in the battery 30 may be supplied to the load 4. On the other hand, when there is a power failure in the grid 3, the second switch 16 is turned off and the first switch 15 is turned on. Thus, power output from the power generation system 2 or the battery 30 may be supplied to the load 4. As a result, accidents which may occur during maintenance of a power grid 3 may be avoided. For example, a worker being shocked by a power line of the grid 3 may be prevented by preventing power supplied to the load 4 from flowing to the grid 3.

The integrated controller 17 monitors states of the power generation system 2, the grid 3, the battery 30, and the load 4. The integrated controller 17 may further control the power conversion unit 11, the bi-directional inverter 13, the bi-directional converter 14, the first switch 15, the second switch 16, and the BMS 20 according to a result of the monitoring. The integrated controller 17 may monitor whether there is a power failure in the grid 3 and whether power is being generated by the power generation system 2. In addition, the integrated controller 17 may monitor an amount of power generated by the power generation system 2, a charging state of the battery 30, an amount of power consumed in the load 4, a time, and the like.

The BMS 20 is connected to the battery 30 and controls charging and discharging operations of the battery 30 under the control of the integrated controller 17. The BMS 20 may perform an overcharging protection function, an overdischarging protection function, an overcurrent protection function, an overvoltage protection function, an overheating protection function, and the like in order to protect the battery 30. In order to control charging and discharging operations of the battery 30, the BMS 20 may monitor a voltage, a current, a temperature, an amount of power remaining, a lifespan, a charging state, or the like, of the battery 30, and may transmit a result of the monitoring to the integrated controller 17. In addition, the BMS 20 according to some embodiments may perform a cell balancing function, which will be described below in detail with reference to FIGS. 2 through 8.

The battery 30 stores power generated by the power generation system 2 and power of the grid 3 and supplies the power stored to the load 4 or the grid 3. The battery 30 may include one or more battery racks connected to each other in series and/or in parallel. The battery racks are a subcomponent constituting the battery 30. Each battery rack may include one or more battery trays connected to each other in series and/or in parallel. The battery trays are a subcomponent constituting each battery rack. Each battery tray may include a plurality of battery cells. The battery 30 may include various kinds of battery cells. For example, the battery 30 may include a nickel-cadmium battery, a lead storage battery, a nickel metal hydride (NiMH) battery, a lithium ion battery, a lithium polymer battery, or the like.

Figure 2:
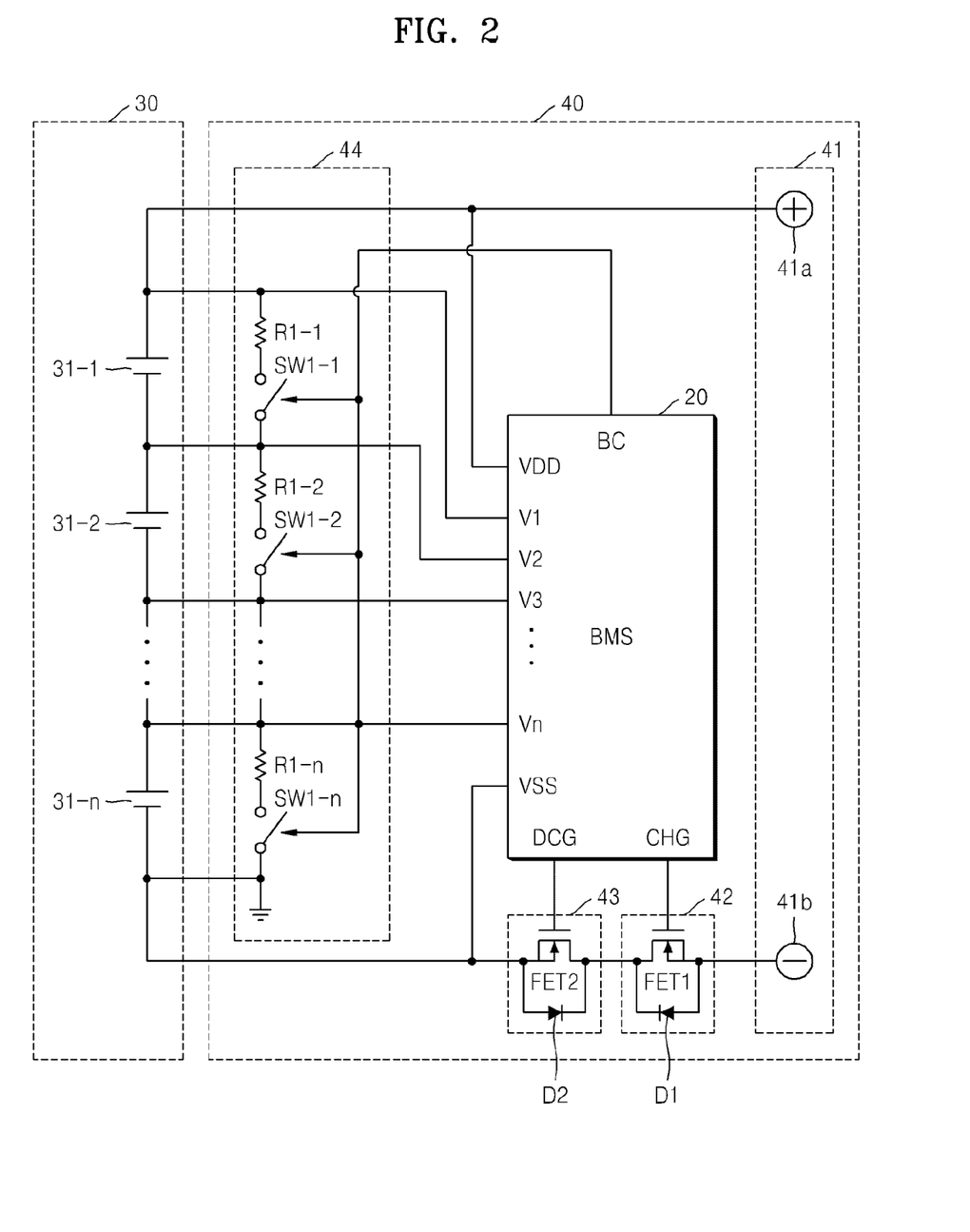
FIG. 2 is circuit diagram illustrating a battery and a protection circuit, according to some embodiments.

FIG. 2 is circuit diagram illustrating the battery 30 and the BMS 20, according to some embodiments. Hereinafter, a combination of the battery 30 and a protection circuit 40 will be referred to as a battery pack.

Referring to FIG. 2, the battery pack of the current embodiment includes the battery 30 and the protection circuit 40.

The battery 30 may include one or more battery cells 31-1 through 31-$n$. The battery 30 may be connected to the protection circuit 40 so as to supply power to the outside or to receive power from the outside. Meanwhile, when the battery 30 is used in the energy storage system 1, the battery cells 31-1 through 31-$n$ illustrated in FIG. 2 may each be an individual battery pack or battery tray constituting the battery 30. Here, a case where 31-1 through 31-$n$ are a plurality of battery cells will be described. However, 31-1 through 31-$n$ may also constitute a plurality of battery trays or a plurality of battery racks.

The protection circuit 40 controls charging and discharging of the battery 30 and also controls each component of the battery pack so as to stably operate the battery pack. The protection circuit 40 may include a terminal unit 41, the BMS 20, a charging control switch 42, a discharging control switch 43, and a balancing circuit unit 44.

The terminal unit 41 includes at least a positive terminal 41$a$ and a negative terminal 41$b$. Power stored in the battery 30 may be supplied to the outside via the terminal unit 41. In addition, external power may be supplied to the battery 30 via the terminal unit 41 so as to charge the battery 30. When the battery 30 is used in a portable device, the terminal unit 41 may be connected to the portable device or a charger. Meanwhile, when the battery 30 is used in the energy storage system 1, the terminal unit 41 may be connected to the bi-directional converter 14 for performing power conversion.

The BMS 20 senses charging and discharging states of the battery 30, a current flow state in the battery pack, and the like, so as to perform functions such as performing a control of charging and discharging of the battery 30. The BMS 20 may include a power terminal VDD, a ground terminal VSS, a charging control terminal CHG, a discharging control terminal DCG, one or more voltage measuring terminals V1 through Vn, and a balancing control terminal BC.

A power voltage and a ground voltage are respectively applied to the power terminal VDD and the ground terminal VSS. When the battery 30 has defects, the charging control terminal) CHG and the discharging control terminal DCG may output a charging control signal for controlling operations of the charging control switch 42 or a discharging control signal for controlling operations of the discharging control switch 43.

The one or more voltage measuring terminals V1 through Vn measure an intermediate voltage of the battery 30. That is, the voltage measuring terminals V1 through Vn are electrically connected to nodes between the battery cells 31-1 through 31-$n$ so as to measure voltages of the battery cells 31-1 through 31-$n$.

The balancing control terminal BC outputs a balancing control signal Sb so as to control ON/OFF operations of switches SW1-1 through SW1-$n$ included in the balancing circuit unit 44. In FIG. 2, only one terminal and one signal line are illustrated. However, their illustration is only for convenience of description. That is, a plurality of the signal lines and a plurality of the terminals may be connected to the balancing control terminal BC and may be formed to control each of the switches SW1-1 through SW1-$n$.

The charging control switch 42 and the discharging control switch 43 may each comprise a field effect transistor (FET) and a parasitic diode. That is, the charging control switch 42 may comprise a field effect transistor FET1 and a diode D1, and the discharging control switch 43 may comprise a field effect transistor FET2 and a diode D2. A connection direction between a source and a drain of the field effect transistor FET1 of the charging control switch 43 may be set opposite to that of the field effect transistor FET2 of the discharging control switch 42. As described, the field effect transistor FET1 of the charging control switch 42 and the field effect transistor FET2 of the discharging control switch 43 may be configured as switching devices. However, FET1 and FET2 may are not limited thereto. Furthermore, an electric device for performing a different kind of switching function may also be used. For example, when the battery 30 is used in the energy storage system 1, a magnitude of current flowing on a large current path may be relatively great, and thus a relay component may be used.

The balancing circuit unit 44 is a circuit for initiating a discharge of at least one battery cell from among the battery cells 31-1 through 31-$n$ so as to balance charge capacities of the battery cells 31-1 through 31-$n$. The balancing circuit unit 44 may include the plurality of switches SW1-1 through SW1-$n$ and resistor R1-1 through R1-$n$. The balancing circuit unit 44 forms a loop with respect to a specific battery cell by switching on or off the switches SW1-1 through SW1-$n$ according to the balancing control signal Sb applied from the BMS 20. Thus, the specific battery cell is selectively discharged, thereby, performing a cell balancing operation.

Figure 3:
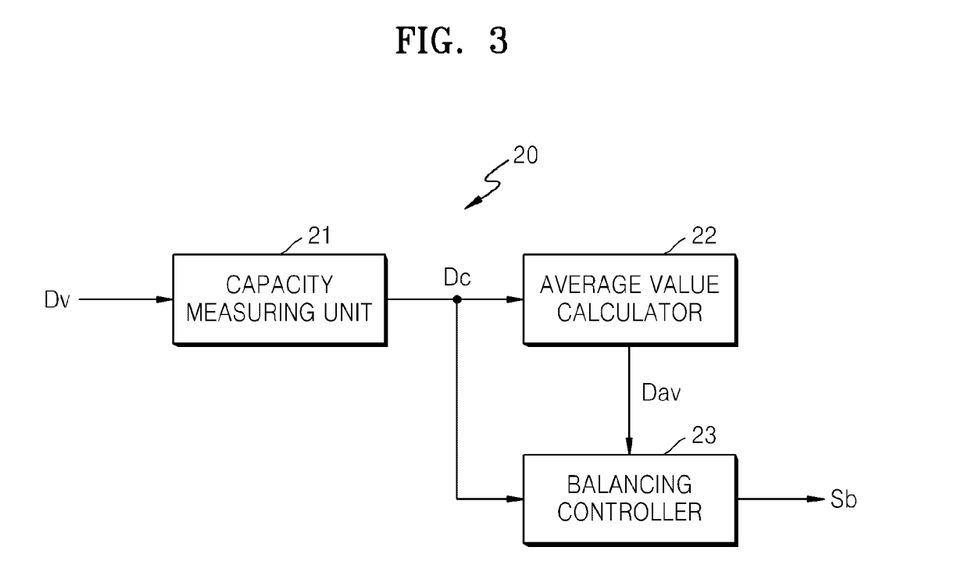
FIG. 3 is a block diagram illustrating a part of a battery management system of FIG. 2, according to some embodiments.

Hereinafter, a cell balancing operation of the BMS 20 according to some embodiments will be described. FIG. 3 is a block diagram illustrating a part of the BMS 20, according to some embodiments. Referring to FIG. 3, the BMS 20 may include a capacity measuring unit 21, an average value calculator 22, and a balancing controller 23.

The capacity measuring unit 21 receives voltage data Dv with respect to an intermediate voltage measured through one or more of the voltage measuring terminals V1 through Vn. The capacity measuring unit 21 calculates charge capacities of the battery cells 31-1 through 31-$n$ by using the received voltage data Dv. The capacity measuring unit 21 may send the calculated charge capacity data Dc to the average value calculator 22 and the balancing controller 23.

The average value calculator 22 calculates an average value of the charge capacities of the battery cells 31-1 through 31-$n$ by using the received charge capacity data Dc. The average value calculator 22 sends calculated average value data Dav to the balancing controller 23.

The balancing controller 23 classifies or select a battery cell that is to be discharged in the cell balancing operation, by using the received charge capacity data Dc and the average value data Dav. The balancing controller 23 may then generate the balancing control signal Sb according to the classified battery cell so as to discharge the classified battery cell.

In detail, the balancing controller 23 establishes a first standard value for classifying or selecting an abnormal battery cell. The abnormal battery cell may be, for example, a deteriorated battery cell from among the battery cells 31-1 through 31-n included in the battery 30. The first standard for classifying or selecting the abnormal battery cell may be calculated by using the average value data Dav. For example, the first standard value may be obtained by multiplying the average value by a predetermined value. For example, the first standard value may be obtained by multiplying the average value by 0.9. That is, the first standard value may be 90% of the average value. As such, the balancing controller 23 may establish the first standard value and recognize a battery cell having a charge capacity less than the first standard value as an abnormal battery cell. When a battery cell is recognized as an abnormal battery cell, the battery cell may not be discharged during the cell balancing operation. Also, when the battery 30 comprises replaceable battery cells, an abnormal battery cell may be replaced.

The balancing controller 23 detects a standard battery cell having the lowest charge capacity from among battery cells having charge capacities greater than the first standard value, and then establishes a second standard value for classifying or selecting a battery cell that is to be discharged during the cell balancing operation based on the standard battery cell. The second standard value may be obtained by multiplying the charge capacity of the standard battery cell by a predetermined value. For example, the second standard value may be obtained by multiplying the charge capacity of the standard battery cell by 1.1. That is, the second standard value may be 110% of the charge capacity of the standard battery cell. As such, the balancing controller 23 establishes the second standard value and classifies battery cells having charge capacities greater than the second standard value as battery cells to be discharged during the cell balancing operation. As a result, a battery cell having an excess charge capacity may be discharged such that a battery cell having a low charge capacity may be charged. However, the present invention is not limited thereto. For example, a battery cell having an excess charge capacity may be discharged without charging a battery cell having a low charge capacity. As a result, the battery cell charge capacities may be balanced.

Alternatively, the balancing controller 23 may establish the second standard value as a value obtained by multiplying the average value by a predetermined value, for example, 1.1. That is, the second standard value may be 110% of the average value.

The balancing controller 23 generates the balancing control signal Sb for discharging the classified battery cells, and corresponding switches in the balancing circuit unit 44 are turned on due to the balancing control signal Sb, thereby performing cell balancing. As a result, a charge stored in each of the battery cells may be substantially equal following cell balancing.

Figure 4:
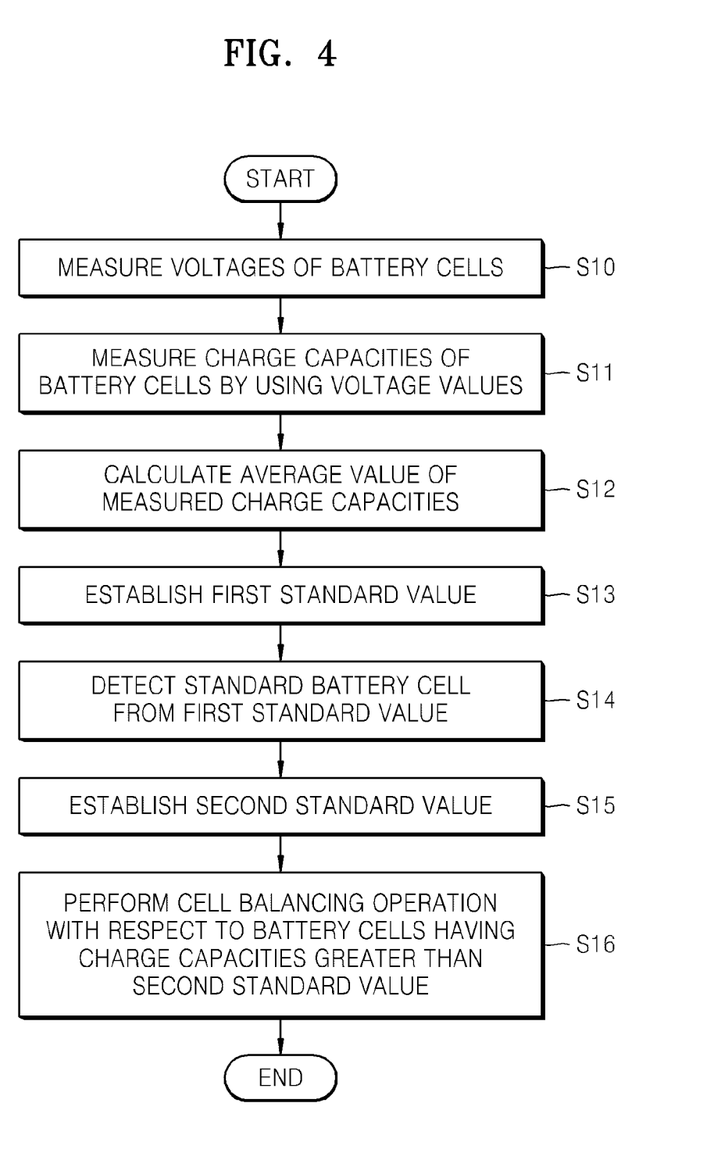
FIG. 4 is a flowchart for explaining a method of controlling the battery management system of FIG. 3, according to some embodiments.

Hereinafter, a method of controlling the BMS 20 of the current embodiment will be described. FIG. 4 is a flowchart for explaining a method of controlling the BMS 20, according to an embodiment of the present invention.

Referring to FIG. 4, the BMS 20 measures voltages of the battery cells 31-1 through 31-n via the voltage measuring terminals V1 through Vn (S10). Then, the capacity measuring unit 21 of the BMS 20 measures charge capacities of the battery cells 31-1 through 31-n by using the voltage values measured (S11).

The average value calculator 22 calculates an average value of the measured charge capacities (S12). The balancing controller 23 establishes the first standard value by using the calculated average value (S13). The balancing controller 23 also detects the standard battery cell by using the first standard value (S14). The standard battery cell may refer to a battery cell having the lowest charge capacity from among battery cells having charge capacities greater than the first standard value.

Meanwhile, the second standard value may be established using the standard battery cell or the average value (S15). Then, a cell balancing operation may be performed with respect to battery cells having charge capacities greater than the second standard value (S16).

Figure 5:
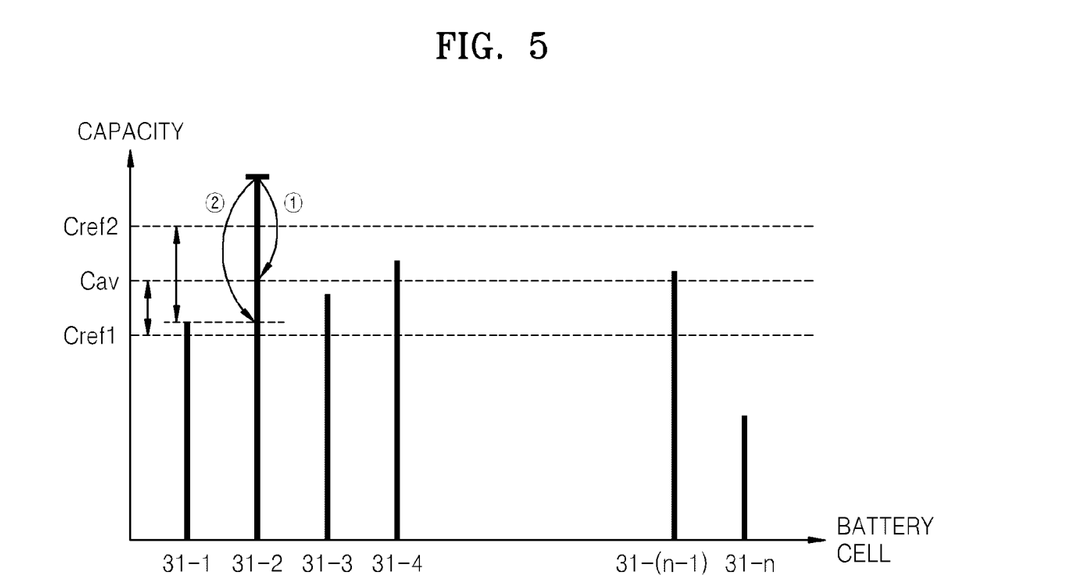
FIG. 5 is a graph for explaining a method of performing a cell balancing operation by using the method of FIG. 4, according to some embodiments.
Figure 6:
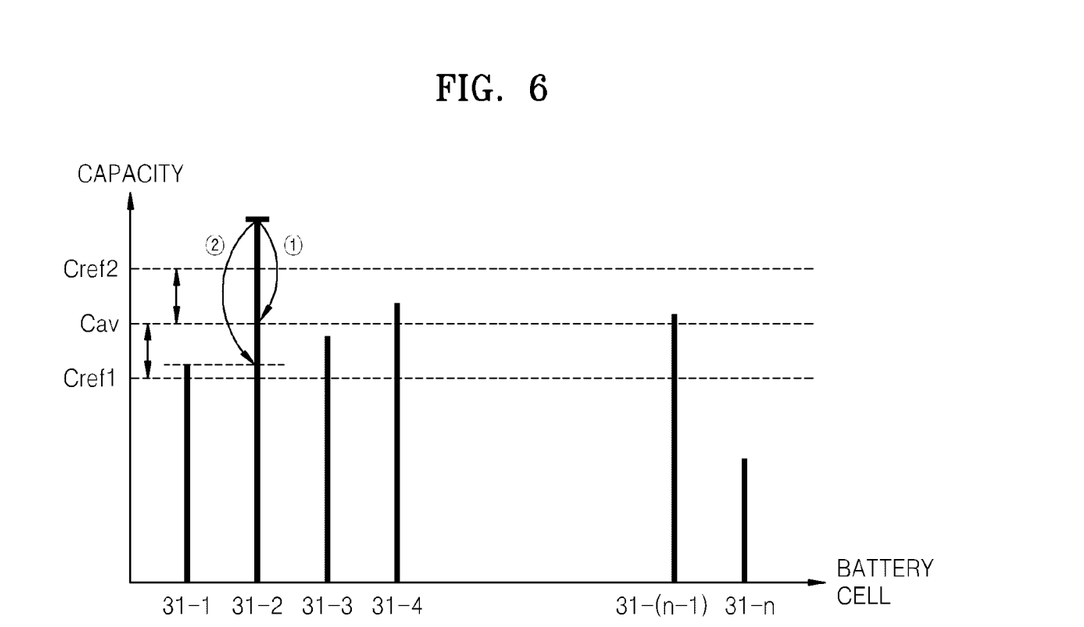
FIG. 6 is a graph for explaining a method of performing a cell balancing operation by using the method of FIG. 4, according to some embodiments.

FIGS. 5 and 6 are graphs for explaining a method of performing a cell balancing operation by using the method of FIG. 4, according to some embodiments.

Referring to FIG. 5, a horizontal axis represents the battery cells, and a vertical axis represents the charge capacity of each battery cell. Cav denotes the average value of the charge capacities of the battery cells, Cref1 denotes the first standard value, and Cref2 denotes the second standard value.

According to some embodiments, the first standard value Cref1 is established based on the average value Cav. The battery cell 31-n has a charge capacity less than the first standard value Cref1, and thus is not discharged during a cell balancing operation.

The battery cell 31-1 has the lowest charge capacity from among battery cells having charge capacities greater than the first standard value Cref1, and thus may be established as the standard battery cell. The second standard value Cref2 is established based on the charge capacity of the standard battery cell. The second standard value may also be established based on an average value of a subset of the battery cells. For example, a subset of battery cells having a capacity which is lower than a predetermined threshold may be selected or classified as standard battery cells. An average value of the subset of standard battery cells may be calculated. The second standard value may be calculated based on the average value of the subset of standard battery cells.

According to some embodiments, the battery cell 31-2 has a charge capacity greater than the second standard value Cref2, and a cell balancing operation is performed with respect to the battery cell 31-2. At this time, the battery cell 31-2 may perform discharging until the charge capacity thereof becomes the average value Cav or the first standard value Cref1. However, the present invention is not limited thereto. That is, a battery cell that is to be discharged during the cell balancing operation may perform discharging until the battery cell reaches any of various predetermined charge capacity levels.

Referring to FIG. 6, a horizontal axis represents the battery cells, and a vertical axis represents the charge capacity of each battery cell. Cav denotes the average value of the charge capacities of the battery cells, Cref1 denotes the first standard value, and Cref2 denotes the second standard value.

According to some embodiments, the second standard value Cref2 may be established based on the average value Cav instead of being based on the charge capacity of the standard battery cell. For example, the second standard value Cref2 may be obtained by multiplying the average value Cav by 1.1. That is, the second standard value Cref2 may be 110% of the average value Cav.

Cell balancing operations performed on the remaining battery cells are the same as those illustrated in FIG. 5, and thus a detailed description thereof will be omitted.

As described above, according to the battery pack, the method of controlling the same, and the energy storage system 1 including the battery pack, a cell balancing operation may be effectively performed.

Figure 7:
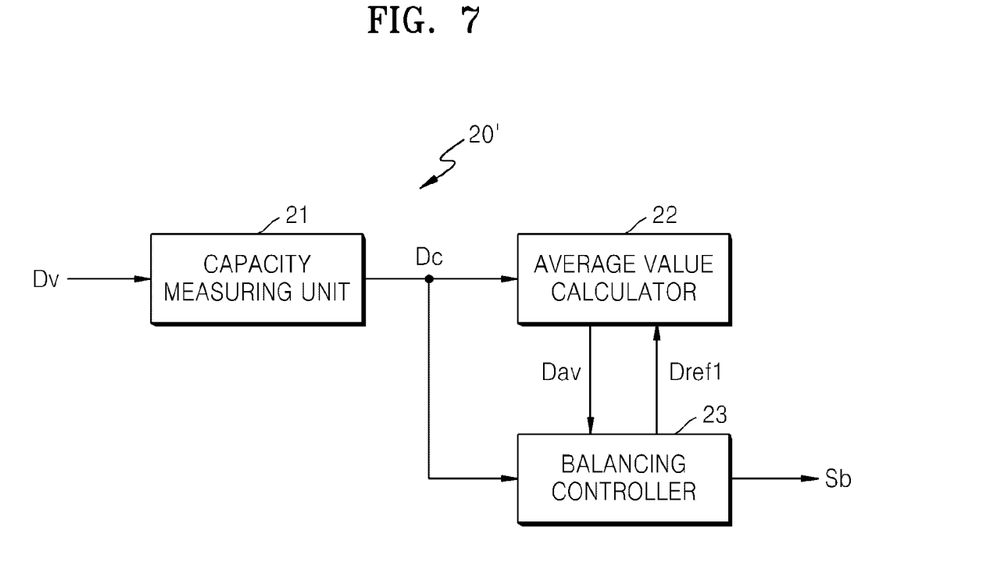
FIG. 7 is a block diagram illustrating a part of a battery management system of FIG. 2, according to some embodiments.

FIG. 7 is a block diagram illustrating a part of a BMS 20', according to some embodiments.

Referring to FIG. 7, the BMS 20' may include a capacity measuring unit 21, an average value calculator 22, and a balancing controller 23.

The capacity measuring unit 21 may receive voltage data Dv with respect to an intermediate voltage measured through one or more of the voltage measuring terminals V1 through Vn. The capacity measuring unit 21 calculates charge capacities of battery cells 31-1 through 31-$n$ by using the received voltage data Dv. The capacity measuring unit 21 sends calculated charge capacity data Dc to the average value calculator 22 and the balancing controller 23.

The average value calculator 22 calculates a first average value, that is, an average value of the charge capacities of the battery cells 31-1 through 31-$n$, by using the received charge capacity data Dc. The average value calculator 22 sends the calculated first average value as average value data Dav to the balancing controller 23. In addition, the average value calculator 22 according to some embodiments receives first standard value data Dref1 from the balancing controller 23. The average value calculator 22 calculates a second average value. The second average value may be an average value of the charge capacities of battery cells having charge capacities greater than the first standard value. Then, the average value calculator 22 sends the second average value as the average value data Dav to the balancing controller 23.

The balancing controller 23 classifies a battery that is to be discharged during a cell balancing operation by using the received charge capacity data Dc and the average value data Dav, and generates a balancing control signal Sb according to the classified battery cell so as to discharge the classified battery cell. Furthermore, the classified battery cell may include a subset of battery cells to be discharged during a cell balancing operation.

In detail, the balancing controller 23 may establish the first standard value for classifying or selecting an abnormal battery cell. The abnormal battery cell may be, for example, a deteriorated battery cell from among the battery cells 31-1 through 31-$n$ included in a battery 30. The first standard value may be calculated by using the average value data Dav with respect to the first average value. The first standard value may be obtained by multiplying the first average value by a predetermined value. For example, the first standard value may be obtained by multiplying the average value by 0.9. That is, the first standard value may be 90% of the average value. As such, the balancing controller 23 may establish the first standard value and recognize a battery cell having a charge capacity less than the first standard value as an abnormal battery cell. When a battery cell is recognized as an abnormal battery cell, the recognized battery cell may not be discharged during the cell balancing operation. Also, when the battery 30 comprises replaceable battery cells, the abnormal battery cell may be replaced. Furthermore, the recognized battery cell may include a subset of battery cells which are determined to be abnormal.

The balancing controller 23 sends the presently established first standard value to the average value calculator 22 as the first standard value data Dref1. The balancing controller 23 receives again the average value data Dav with respect to the second average value after sending the first standard value data Dref1. The balancing controller 23 also establishes again the first standard value by using the second average value.

The balancing controller 23 detects a standard battery cell by using the first standard value established finally. The balancing controller 23 also establishes the second standard value for classifying or selecting a battery cell that is to be discharged during the cell balancing operation, and generates the balancing control signal Sb based on the second standard value. The above described operations are the same as those of the balancing controller 23 illustrated in FIG. 3, and thus a detailed description thereof will be omitted.

Figure 8:
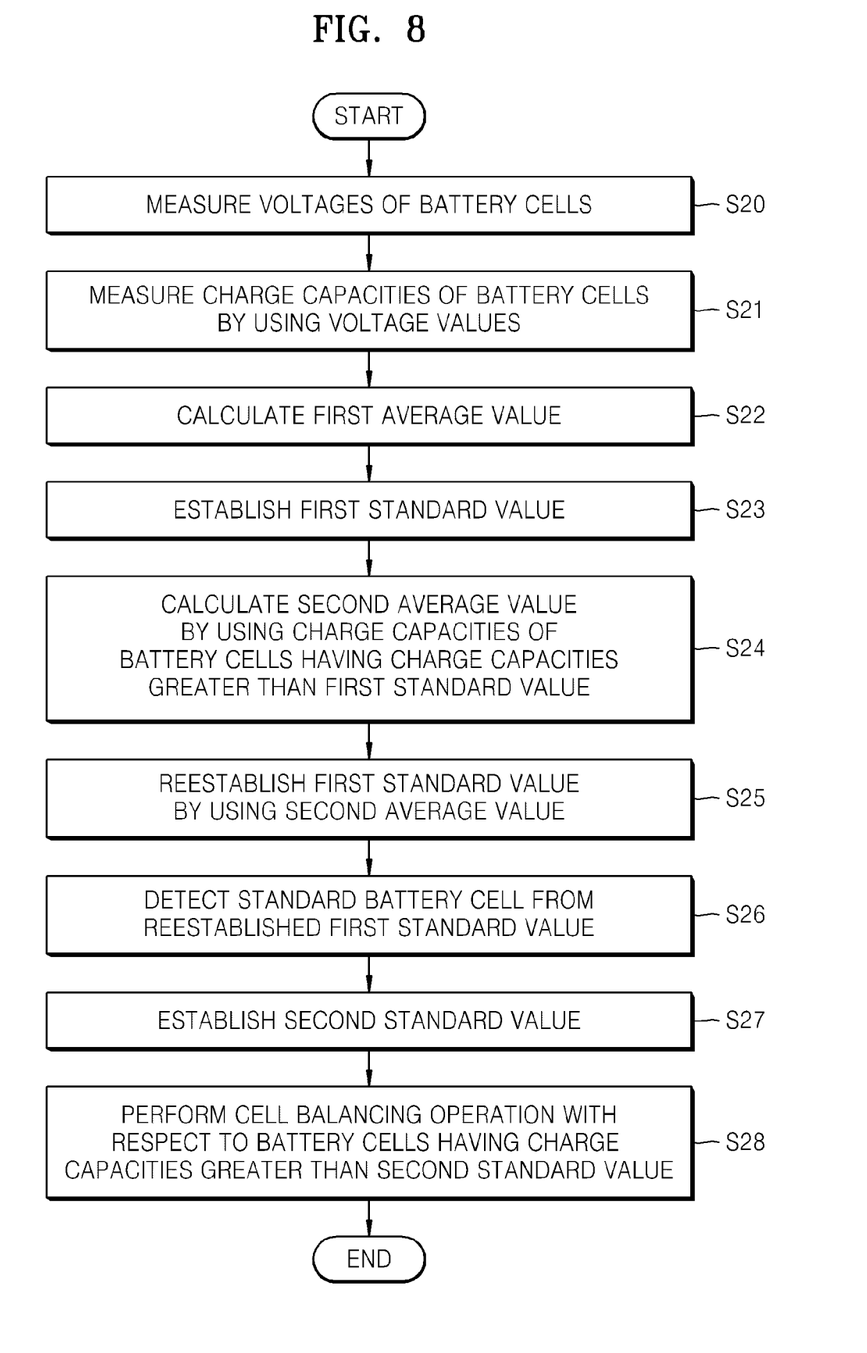
FIG. 8 is a flowchart for explaining a method of controlling the battery management system of FIG. 7, according to some embodiments.

Hereinafter, a method of controlling the BMS 20' of the current embodiment will be described. FIG. 8 is a flowchart for explaining the method of controlling the BMS 20', according to some embodiments.

Referring to FIG. 8, the BMS 20' measures voltages of the battery cells 31-1 through 31-$n$ via the voltage measuring terminals V1 through Vn (S20). Then, the capacity measuring unit 21 of the BMS 20' measures charge capacities of the battery cells 31-1 through 31-$n$ by using the voltage values measured (S21).

The average value calculator 22 calculates the first average value, which is an average value of the measured charge capacities (S22). The balancing controller 23 establishes the first standard value by using the calculated average value (S23).

The average value calculator 22 receives the established first standard value and calculates the second average value, which is an average value of the charge capacities of battery cells having charge capacities greater than the first standard value (S24). The balancing controller 23 reestablishes the first standard value by using the second average value (S25).

The balancing controller 23 detects the standard battery cell from the reestablished first standard value (S26), and establishes the second standard value using the standard battery cell or the average value (S27). Then, a cell balancing operation is performed with respect to battery cells having charge capacities greater than the second standard value (S28).

According to one or more embodiments, a method of controlling a battery pack including a plurality of battery cells is disclosed. The method may include calculating charge capacities of the battery cells, obtaining a first average value, which is an average value of the calculated charge capacities, establishing a first standard value for selecting an abnormal battery cell based on the first average value, and determining a first battery cell having the lowest charge capacity from among battery cells having charge capacities greater than the first standard value. The method may further include establishing a second standard value for selecting at least one battery cell that is to be discharged during a cell balancing operation, and performing the cell balancing operation with respect to battery cells having charge capacities greater than the second standard value.

The method may further include determining a battery cell having a charge capacity less than the first standard value as an abnormal battery cell. The method may further include removing a battery cell having a charge capacity less than the first standard value from the battery pack.

The cell balancing operation may be performed to adjust the charge capacity of the battery cell that is to be discharged to the charge capacity of the first battery cell. The cell balancing operation may also be performed to adjust the charge capacity of the battery cell that is to be discharged to the average value.

According to some embodiments, the method may further include establishing the first standard value to be 90% of the first average value. The method may further include establishing the second standard value to be 110% of the charge capacity of the first battery cell.

According to some embodiments, the method may further include establishing the second standard value to be 110% of the first average value. The method may further include calculating a second average value, which is an average value of the charge capacities of the battery cell having charge capacities greater than the first standard value.

According to some embodiments, the method may further include establishing the first standard value based on the second average value. The method may further include establishing the first standard value to be 90% of the second average value.

According to some embodiments, the method may further include establishing the second standard value to be 110% of the second average value.

According to one or more embodiments, a battery pack may include a plurality of battery cells, a capacity measuring unit configured to measure charge capacities of the battery cells, and an average value calculator configured to calculate an average value of the measured charge capacities. The battery pack may further include a balancing controller configured to select a battery cell that is to be discharged during a cell balancing operation based on the measured charge capacities and the average value, and a balancing circuit unit for performing the cell balancing operation according to a control signal applied from the balancing controller.

According to some embodiments, the balancing controller is further configured to establish a first standard value for selecting an abnormal battery cell based on the average value; detects a first battery cell having the lowest charge capacity from among battery cells having charge capacities greater than the first standard value, establish a second standard value for selecting the battery cell that is to be discharged during the cell balancing operation, and establish that battery cells having charge capacities greater than the second standard value are to be discharged during the cell balancing operation.

According to some embodiments, the balancing controller controls the balancing circuit unit so as to adjust the charge capacity of the battery cell that is to be discharged during the cell balancing operation to the charge capacity of the first battery cell.

According to some embodiments, the balancing controller controls the balancing circuit unit so as to adjust the charge capacity of the battery cell that is to be discharged during the cell balancing operation to the first average value.

According to some embodiments, the second standard value may be established based on the charge capacity of the first battery cell. The second standard value may also be established based on the first average value.

According to some embodiments, the balancing controller may be configured to send information of the battery cells having charge capacities greater than the first standard value to the average value calculator, and the average value calculator may be configured to calculate a second average value, which is an average value of the charge capacities of the battery cells having charge capacities greater than the first standard value.

According to one or more embodiments, an energy storage system that is connected to a battery including a plurality of battery cells, a power generation system, and a grid so as to supply power to a load is disclosed. The energy storage system may include a capacity measuring unit configured to measure charge capacities of the battery cells, an average value calculator configured to calculate an average value of the measured charge capacities, and a balancing controller configured to select a battery cell that is to be discharged during a cell balancing operation based on the measured charge capacities and the average value and for performing the cell balancing operation with respect to the selected battery cell.

As described above, according to the battery pack, the method of controlling the same, and the energy storage system including the battery pack, a cell balancing operation may effectively be performed. In an energy storage system, effective management of a battery is an important aspect in efficient power management. The battery should be managed with consideration to various factors such as charging, discharging, cell balancing, and the like. According to the aspects described above, the lifespan of the battery can be increased and power can be stably supplied to a load by effectively managing the battery through the cell balancing operation. As a result, the effect of power consumption and generation to the environment may be reduced.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A method of controlling a battery pack comprising a plurality of battery cells, the method comprising:
   calculating charge capacities of the battery cells;
   obtaining a first average value, wherein the first average value is an average value of the calculated charge capacities;
   establishing a first standard value for selecting an abnormal battery cell based on the first average value;
   determining a first battery cell having the lowest charge capacity from among battery cells having charge capacities greater than the first standard value;
   establishing a second standard value for selecting at least one battery cell that is to be discharged during a cell balancing operation; and
   performing a cell balancing operation with respect to the at least one battery cell having charge capacities greater than the second standard value.

2. The method of claim 1, further comprising determining a battery cell having a charge capacity less than the first standard value as an abnormal battery cell.

3. The method of claim 1, further comprising removing a battery cell having a charge capacity less than the first standard value from the battery pack.

4. The method of claim 1, wherein the cell balancing operation is performed to adjust the charge capacity of a battery cell that is to be discharged to a charge capacity of the first battery cell.

5. The method of claim 1, wherein the cell balancing operation is performed to adjust the charge capacity of a battery cell that is to be discharged to the first average value.

6. The method of claim 1, further comprising establishing the first standard value to be 90% of the first average value.

7. The method of claim 1, further comprising establishing the second standard value to be 110% of the charge capacity of the first battery cell.

8. The method of claim 1, further comprising establishing the second standard value to be 110% of the first average value.

9. The method of claim 1, further comprising calculating a second average value, which is an average value of the charge capacities of the battery cells having charge capacities greater than the first standard value.

10. The method of claim 9, further comprising establishing the first standard value based on the second average value.

11. The method of claim 10, further comprising establishing the first standard value to be 90% of the second average value.

12. The method of claim 9, further comprising establishing the second standard value to be 110% of the second average value.

13. A battery pack comprising:
a plurality of battery cells;
a capacity measuring unit configured to measure charge capacities of the battery cells;
an average value calculator configured to calculate an average value of the measured charge capacities;
a balancing controller configured to: establish a first standard value for selecting an abnormal battery cell based on the average value;
detect a first battery cell having the lowest charge capacity from among battery cells having charge capacities greater than the first standard value;
establish a second standard value for selecting a battery cell that is to be discharged during the cell balancing operation; and
establish that battery cells having charge capacities greater than the second standard value are to be discharged during the cell balancing operation; and
a balancing circuit unit configured to perform the cell balancing operation according to a control signal applied from the balancing controller.

14. The battery pack of claim 13, wherein the balancing controller is configured to control the balancing circuit unit so as to adjust the charge capacity of a battery cell that is to be discharged to the charge capacity of the first battery cell.

15. The battery pack of claim 13, wherein the balancing controller controls the balancing circuit unit so as to adjust the charge capacity of a battery cell that is to be discharged to the first average value.

16. The battery pack of claim 13, wherein the second standard value is established based on the charge capacity of the first battery cell.

17. The battery pack of claim 13, wherein the second standard value is established based on the first average value.

18. The battery pack of claim 13, wherein the balancing controller is configured to send information of the battery cells having charge capacities greater than the first standard value to the average value calculator, and the average value calculator is configured to calculate a second average value, which is an average value of the charge capacities of the battery cells having charge capacities greater than the first standard value.

19. An energy storage system that is connected to a battery comprising a plurality of battery cells, a power generation system, and a grid so as to supply power to a load, the energy storage system comprising:
a capacity measuring unit configured to measure charge capacities of the battery cells;
an average value calculator configured to calculate an average value of the measured charge capacities; and
a balancing controller configured to:
establish a first standard value for selecting an abnormal battery cell based on the average value;
detect a first battery cell having the lowest charge capacity from among battery cells having charge capacities greater than the first standard value;
establish a second standard value for selecting a battery cell that is to be discharged during the cell balancing operation; and
establish that battery cells having charge capacities greater than the second standard value are to be discharged during the cell balancing operation, and
wherein the balancing controller is further configured to perform a cell balancing operation with respect to the selected battery cell.

* * * * *